(12) United States Patent
Razavi et al.

(10) Patent No.: US 11,005,693 B2
(45) Date of Patent: May 11, 2021

(54) DYNAMIC CYCLIC PREFIX CONFIGURATION

(71) Applicant: VODAFONE IP LICENSING LIMITED, Newbury (GB)

(72) Inventors: Razieh Razavi, London (GB); Timothy Frost, London (GB)

(73) Assignee: VODAFONE IP LICENSING LIMITED, Newbury (GB)

( * ) Notice: Subject to any disclaimer, the term of this patent is extended or adjusted under 35 U.S.C. 154(b) by 0 days.

(21) Appl. No.: 16/303,412

(22) PCT Filed: May 23, 2017

(86) PCT No.: PCT/GB2017/051430
§ 371 (c)(1),
(2) Date: Nov. 20, 2018

(87) PCT Pub. No.: WO2017/203227
PCT Pub. Date: Nov. 30, 2017

(65) Prior Publication Data
US 2020/0336348 A1 Oct. 22, 2020

(30) Foreign Application Priority Data
May 23, 2016 (GB) ...................................... 1609023

(51) Int. Cl.
*H04L 27/26* (2006.01)
*H04B 17/336* (2015.01)
(Continued)

(52) U.S. Cl.
CPC ....... *H04L 27/2607* (2013.01); *H04B 17/336* (2015.01); *H04L 25/0222* (2013.01); *H04L 25/03006* (2013.01)

(58) Field of Classification Search
CPC ............. H04L 27/2607; H04L 27/2646; H04L 25/0216; H04L 25/0222; H04L 25/03006;
(Continued)

(56) References Cited

U.S. PATENT DOCUMENTS 8,565,082 B1 * 10/2013 Vargantwar ......... H04L 27/2607
370/230
9,331,827 B2 5/2016 Siomina et al.
(Continued)

FOREIGN PATENT DOCUMENTS

WO 2007067843 A2 6/2007
WO 2007099485 A1 9/2007
(Continued)

OTHER PUBLICATIONS

International Search Report and Written Opinion issued in PCT/GB2017/051430 dated Nov. 10, 2017.
(Continued)

*Primary Examiner* — Khanh C Tran
(74) *Attorney, Agent, or Firm* — Workman Nydegger

(57) ABSTRACT

A cyclic prefix is configured for transmissions on a cellular network using a Radio Access Technology based on Orthogonal Frequency Division Multiplexing (OFDM). At a User Equipment (UE) of the cellular network, information is determined for calculating a delay spread for transmission symbols from a base station of the cellular network to the UE. A cyclic prefix for the transmissions is identified based on the determined information. A delay spread can be established from received transmission symbols by: determining a coherence bandwidth based on whether a channel coefficient for each of the transmission symbols varies more than a predefined threshold, the delay spread being established using the determined coherence bandwidth; and/or determining a relationship between a cyclic prefix associated
(Continued)

with the transmission symbols and a signal-to-interference-plus-noise ratio, SINR, for the received transmission symbols, the delay spread being established using the determined relationship.

11 Claims, 2 Drawing Sheets

(51) Int. Cl.
*H04L 25/02* (2006.01)
*H04L 25/03* (2006.01)

(58) Field of Classification Search
CPC . H04L 25/0202; H04L 5/0051; H04B 7/0626; H04B 17/336; H04B 7/0619
See application file for complete search history.

(56) References Cited

U.S. PATENT DOCUMENTS

| | | | |
|---|---|---|---|
| 2003/0086371 A1 | 5/2003 | Walton et al. | |
| 2003/0153358 A1* | 8/2003 | Moon | H04L 1/206 455/561 |
| 2003/0204380 A1* | 10/2003 | Dishman | G06K 9/624 702/189 |
| 2007/0104149 A1* | 5/2007 | Khan | H04L 1/0009 370/334 |
| 2010/0177833 A1 | 7/2010 | Meuller | |
| 2010/0227561 A1 | 9/2010 | Chakraborty et al. | |
| 2012/0263108 A1* | 10/2012 | Ban | H04W 8/26 370/328 |
| 2012/0281551 A1 | 11/2012 | Alanara | |
| 2012/0314630 A1* | 12/2012 | Walker | H04L 5/0039 370/281 |
| 2013/0315321 A1 | 11/2013 | Rajagopal et al. | |
| 2015/0207646 A1 | 7/2015 | Nilsson et al. | |
| 2017/0244586 A1* | 8/2017 | Yoo | H04W 72/042 |
| 2017/0257238 A1* | 9/2017 | Qian | H04L 27/2628 |
| 2018/0091373 A1* | 3/2018 | Manolakos | H04L 41/0896 |

FOREIGN PATENT DOCUMENTS

| | | |
|---|---|---|
| WO | 2010064968 A1 | 6/2010 |
| WO | 2013154334 A1 | 10/2013 |
| WO | 2016065169 A1 | 4/2016 |

OTHER PUBLICATIONS

Ma et al. "Cyclic Prefix Adaptation with Constant Overall Symbol Time for DFT-Spread-OFDM and OFDM" 2016 IEEE 83rd Vehicular Technology Conference, May 15, 2016, pp. 1-5, XP032920148.
Search Report issued in GB 1609023.5 dated Dec. 29, 2016.
European Exam Report for EP 17725760.7 dated Feb. 24, 2020.

* cited by examiner

DYNAMIC CYCLIC PREFIX CONFIGURATION

The present application is a 371 US Nationalization of PCT International Application No. PCT/GB2017/051430, filed May 23, 2017, which claims priority to United Kingdom Patent Application No. 1609023.5, filed May 23, 2016, the disclosures of which are enclosed herewith in their entirety.

TECHNICAL FIELD OF THE INVENTION

The invention concerns a method for configuring a cyclic prefix for transmissions on a cellular network using a Radio Access Technology based on Orthogonal Frequency Division Multiplexing (OFDM), a method of establishing a delay spread from received transmission symbols using OFDM. A cellular network device associated with these methods is also provided.

BACKGROUND TO THE INVENTION

Orthogonal Frequency Division Multiplexing (OFDM) is a well-known Radio Access Technology (RAT), especially in cellular networks. The Third Generation Partnership Project (3GPP) has standardised the Long Term Evolution (LTE) architecture using an OFDM RAT. It has further been working on a fifth generation (5G) architecture, which also intends to use an OFDM RAT, as identified in 3GPP RP-160671.

However, the 5G radio structure is intended to work at frequency bands higher than 6 GHz, such as 30 GHz or 70 GHz. Such frequency bands have poor radio propagation properties, making it more difficult to achieve macro cellular coverage and to be able to serve devices far away from a base station site, in comparison with earlier architectures using lower frequencies. In view of this issue, it is understood that large antenna arrays will likely be needed in both the Base Station and user terminal (User Equipment or UE). Beamforming may also be required, such that the downlink signal is directed towards the device, and vice versa in uplink.

A key implementation detail in OFDM is the use of a Cyclic Prefix (CP) after each transmitted signal in time, to prevent Inter-Symbol Interference (ISI). It is known that ISI is affected by the delay spread over the channel, which depends on the presence of reflections of the signal. Hence, the length of the CP required depends on the delay spread. In LTE, the CP is set to a fixed value, but it has been assumed that 5G systems will scale the CP with the symbol period. At higher frequency bands, it is likely that a shorter symbol period will be used, because properties of the RF receiver in devices mean that the spacing of the OFDM subcarriers will likely need to be increased. A shorter CP is advantageous, if possible, because it would reduce the overhead in the system and higher spectral efficiency could then be achieved.

International (PCT) patent application No. WO-2013/010247 suggests that the length (time duration) of the CP should be chosen to be longer than the multipath delay spread. However, uplink channels may have different respective multipath delay spreads. Rather than setting the same CP for all uplink channels, which is longer than the largest multipath delay spread, the multipath delay spread for each uplink channel is identified at the base station and a CP for each uplink channel is set accordingly. In practice, this method considers any pre-equalization to be part of the channel, as it may have an effect to reduce the length of the multipath delay spread. Thus, channel estimation at the base station receiver is used to determine the CP and a specific delay spread need not be calculated.

This specific approach may be an improvement over the use of a fixed CP. Nevertheless, it is specific to uplink channels and only a particular solution is suggested. Finding other approaches to address this issue in a broader context is therefore desirable.

SUMMARY OF THE INVENTION

Against this background, the present invention provides a method for configuring a cyclic prefix for transmissions on a cellular network using a Radio Access Technology (RAT) or air interface based on Orthogonal Frequency Division Multiplexing (OFDM) in accordance with claim 1 and a method of establishing a delay spread from received transmission symbols using a transmission technology based on OFDM in line with claim 11. A cellular network device, such as a mobile terminal (UE), base station controller, base station or other network entity, in line with claim 6 is also provided. The invention may also be embodied in the form of a computer program (which may be stored on a computer readable medium), programmable logic, firmware or other configurable system. Other preferred features are disclosed with reference to the claims and in the description below.

At a UE of the cellular network, information for calculating a delay spread is determined. This delay spread is for transmission symbols transmitted from a base station of the cellular network and received at the UE. Then, a cyclic prefix (CP) for future (subsequent) transmissions on the cellular network is identified based on the determined information. Thus, the delay spread for downlink transmission symbols is used to identify a CP for subsequent uplink or downlink transmissions (the uplink being particularly applicable for Time Division Duplex implementations). This can be of particular benefit Some or all of the downlink transmission symbols used for the determined information may be pilot symbols, which are advantageously transmitted with the same power level. The approach of the present invention may be applicable for use at a wide range of frequencies, but particularly those above 6 GHz or even higher, above 10, 20 or 25 GHz. The benefits of the invention may be even greater with use at higher frequencies.

A delay spread for the transmission symbols is normally calculated, but in some cases, the cyclic prefix may be determined without specifically calculating the delay spread. Two general techniques for determining the delay spread are provided. A coherence bandwidth may be determined based on whether a channel coefficient for each of the transmission symbols varies more than a predefined threshold and the determined coherence bandwidth may then be used to establish the delay spread. In particular, the delay spread may approximate to the reciprocal of the coherence bandwidth.

An alternative approach involves determining a relationship between a cyclic prefix associated with the transmission symbols and a Signal-to-Interference-plus-Noise Ratio (SINR) for the transmission symbols received at the UE. In practice, a SINR for a first subset of the transmission symbols may be measured, in which the first subset of the transmission symbols are transmitted with a first cyclic prefix. Then, a SINR for a $n^{th}$ subset of the transmission symbols may be determined, in which n is initially set as 2. The $n^{th}$ subset of the transmission symbols are transmitted with a $n^{th}$ cyclic prefix that is shorter than the first cyclic prefix. If the SINR for the $n^{th}$ subset of the transmission symbols is not less than the SINR for the first subset of the transmission symbols by at least a predetermined amount, the step of measuring a SINR for a $n^{th}$ subset of the transmission symbols may be repeated for n=n+1. Here, the $(n+1)^{th}$ cyclic prefix is beneficially smaller than the $n^{th}$ cyclic prefix (for instance, by reducing the $n^{th}$ cyclic prefix by a predetermined amount. If the SINR for the $n^{th}$ subset of the transmission symbols is less than the SINR for the first subset of the transmission symbols by at least a predetermined amount, the delay spread may be established based on (for instance, as equal to) the $(n-1)^{th}$ cyclic prefix.

These two approaches may be combined. Additionally, the approaches may be implemented independently of the cyclic prefix identification method discussed above.

The delay spread or the determined information (which may be used to calculate the delay spread) is advantageously reported from the UE to the base station. Alternatively, the UE can determine a CP from the determined information and/or calculated delay spread, which may then be reported to the base station. Once a CP has been set, a change in the delay spread may be identified at the UE. The UE may then communicate to the base station, an indication that an adjustment to the cyclic prefix for the transmissions should be made. In all cases, the base station advantageously determines, identifies and/or adjusts the CP to be used on the subsequent transmissions and then communicates an instruction to the UE, to set or adjust the cyclic prefix for transmitting the subsequent uplink transmissions and/or receiving the subsequent downlink transmissions at the UE. In this way, the base station can retain control over the CP that is set, which may be of benefit for synchronisation reasons.

For determination of the delay spread, it is highly desirable that intra-carrier inter-symbol interference is the dominant source of interference to the transmission symbols from the base station to the UE. This checking may be achieved by estimating a respective SINR for each of the base station's transmission symbols and confirming that the SNIR for the transmission symbol transmitted first in time is higher than the respective SNIR for each of a plurality of subsequent transmission symbols. Additionally or alternatively, steps may be taken to make intra-carrier inter-symbol interference the dominant source of interference to the transmission symbols from the base station to the UE, in particular by configuring their transmission. Approaches to achieve this may comprise one or more of: setting a cyclic prefix associated with the transmission symbols on all or a subset of subcarriers, based on a pre-determined worst possible delay spread for the UE; inserting a guard period after the transmission symbols on all or a subset of subcarriers (by muting at least part of a symbol subsequent to the transmission symbols); and muting some of the transmission symbols on all or a subset of subcarriers.

In some scenarios, the UE may communicate with multiple base stations, for example using Cooperative Multi-Point (CoMP) technology. Then, the base station may be a first base station and the determined information is first information and the UE may be configured to communicate with the first base station and with a second base station of the cellular network at the same time. The UE may then determine second information for calculating a delay spread for transmission symbols from the second base station to the UE. The CP may be identified based on the first information and the second information, in particular the information that would indicate a longer delay spread for the two (or more) base stations.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 1:
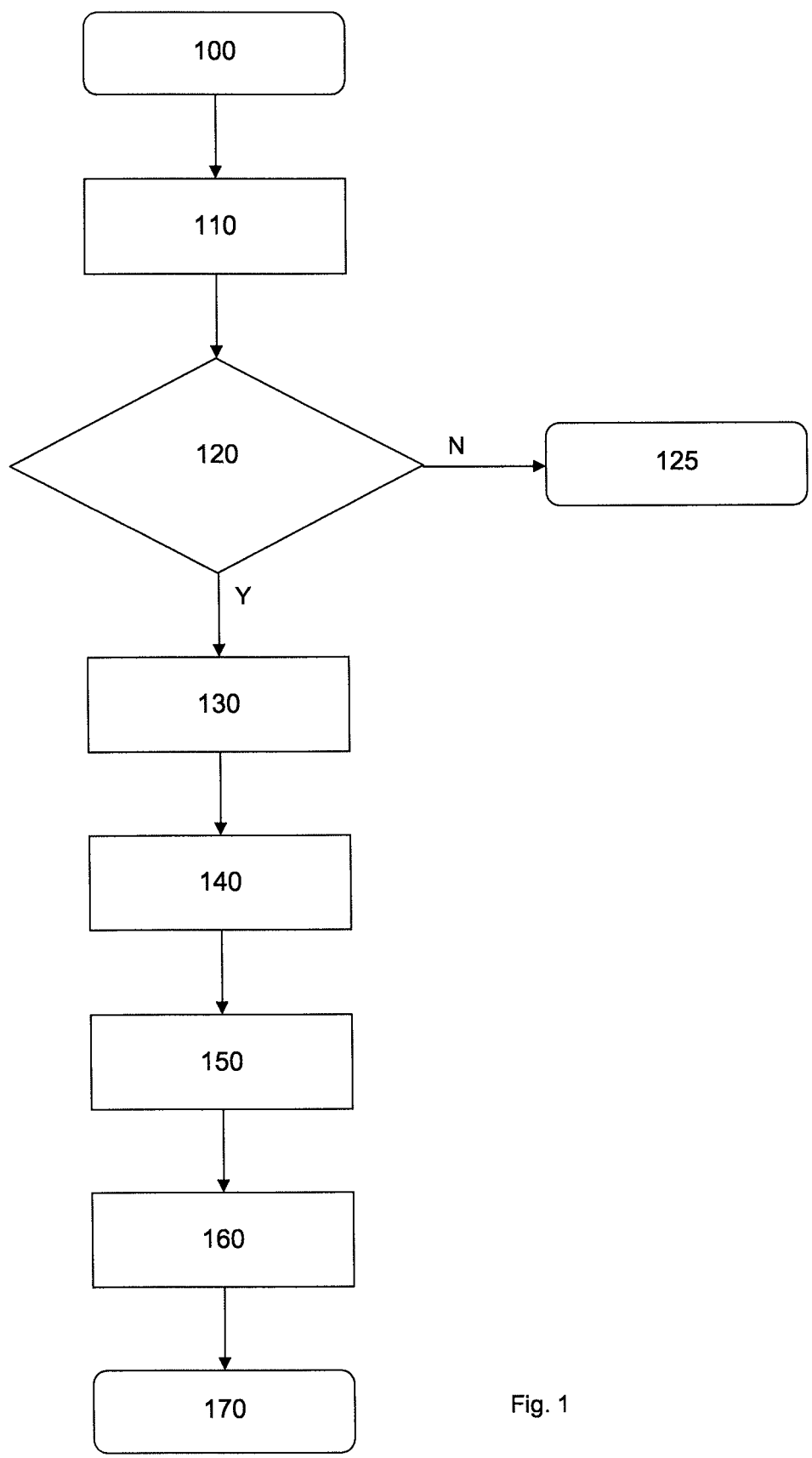
FIG. 1 shows a flow chart to indicate a first method of operation in accordance with the disclosure.

Due to the nature of narrow beams at high frequencies (above 5 or 6 GHz, for instance) and the higher sensitivity to reflections and the environment in these bands, it has been found that the delay spread is typically more variable at such frequencies. In some cases, the second path received may actually have a higher signal level than the first path received. Setting a CP value too short will not cope with such extended delay spread and may lead to worsening link performance, due to high ISI. In contrast, setting a CP value that is too high would cope with ISI, but would waste spectral efficiency for no reason, since the CP is an overhead. Another concern arises if the device is receiving downlink transmissions simultaneously from multiple Base Stations. Here, there is a danger that different delays may occur between the two signals. A short CP that copes with ISI on one signal may not cope with ISI on the other.

Therefore, it has been recognised that the optimal cyclic prefix to set for the radio interface may depend on the specific environment of the mobile device (which for ease of reference will be termed a UE below, but any type of user network terminal may be considered). The base station could determine the delay spread on the uplink channel, but pre-equalization may make this information less useful for the downlink channel and would require additional channel estimation steps at the base station. A better solution is for the delay spread to be determined at the UE using the downlink channel. In existing technologies, the UE measures the channel and reports this information to the base station, so measurement and/or reporting of delay spread fits well into such systems. Moreover, measurements on the downlink channel can be used to make determinations on the uplink channel, which not necessarily possible the other way around. Once the Base Station has acquired information of the actual delay spread experienced by the UE, it can adapt the Cyclic Prefix to suit the actual delay spread observed. This can help the link performance and improve the end-user experience in terms of throughput and coverage.

In order to implement this approach, there are two main steps: obtaining information from transmissions received at the UE from the base station that would allow a delay spread to be determined (in practice, calculated, detected, measured or estimated); and identifying a CP for subsequent transmissions (downlink and/or uplink) based on this information. Advantageously, the delay spread is actually determined. Ways to determine the delay spread and the information needed for such determinations will first be discussed below. Then, the mechanism for setting the CP based on that delay spread will be considered.

Before beginning these discussions, this concept can be expressed in general terms as a method for configuring a cyclic prefix for transmissions on a cellular network using a Radio Access Technology (RAT) based on OFDM. The method comprises: determining, at a User Equipment, UE, of the cellular network, information for calculating a delay spread for transmission symbols from a base station of the cellular network to the UE; and identifying a cyclic prefix for the transmissions based on the determined information. Optionally, the method further comprises establishing the delay spread based on the determined information.

Referring first to FIG. 1, there is shown a flow chart to indicate a first method of operation in accordance with the disclosure. The flow chart starts with initialisation step 100. Then, an initial configuration step 110 is carried out, in order to allow determination of the delay spread.

Determination of the delay spread by measuring the radio channel at the UE will now be discussed. Typically, the characteristics of the radio channel are identified based on channel estimation of a known pilot signal. In order to identify what sort of channel would be observed for a particular beam, the same transmission method should be sent for both the pilot channel and the subsequent data channel.

In order to help ensure good detection by the device of the delay spread experienced by the pilot signal, it is highly desirable that there is low interference on any part of the channel during the detection period. If there is more than a small level of interference to the channel, then it is likely that intra-carrier ISI will not be the dominant source of interference in the channel. However, the total amount of interference will often depend on the level of inter-site interference observed. Therefore, muting of the channel in some way could be used to ensure that there is no interference during the delay spread detection time period. This is performed in initial configuration step 110. Afterwards, a check is made, in checking step 120, to confirm that the delay spread can be measured, for example by checking that interference on at least part of the channel during a detection period is near to zero. If not, the process stops at end step 125.

In the general terms discussed above, the transmission symbols from a base station of the cellular network to the UE may therefore comprise (or potentially consist of) pilot symbols. However, other types of symbols could alternatively or additionally be used.

In general, an additional method step may also be provided, to confirm that the information obtained may be used to determine a delay spread. For example, the method may further comprise: checking that intra-carrier inter-symbol interference is the dominant source of interference to the transmission symbols from the base station to the UE. Additionally or alternatively, the method may further comprise: configuring the transmission symbols from the base station to the UE such that intra-carrier inter-symbol interference is the dominant source of interference to the transmission symbols from the base station to the UE.

In order to achieve the condition that intra-carrier ISI will not be the dominant source of interference, a number of approaches are considered in the device. Effectively, these mute the channel in order to reduce interference sources other than intra-carrier ISI. These will be discussed with the assumption that the measurements are taken using the pilot symbols, but these may be applied to other symbols equivalently. In a first approach, a long (large) CP may be used after the pilot symbol on some subcarriers, to mitigate any ISI for the pilot estimation on those subcarriers. In this case, the length of the long CP can be decided according to the worst possible delay spread that can be experienced by user. In a second approach, a nominally short CP is used and a guard period is inserted after the pilot symbol on all or a subset of subcarriers. This guard period may be created by the muting a subsequent symbol or part of the subsequent symbol. A third approach also uses a nominally short CP and the second part of the pilot symbol is muted on all or a subset of subcarriers, to generate a guard period prior to the CP. Such approaches form part of the configuration step 110.

Muting the channel, either via longer CP or inserted guard period, could be done periodically at known times and subcarrier locations. Additionally or alternatively, the UE can estimate a signal-to-interference-plus-noise (SINR) ratio on a per symbol basis. Then, if it is detected that the first symbol transmitted for this UE has a higher SINR than the subsequent symbols, this may indicate that intra-carrier is the dominant source of interference. If the first and second symbols are both pilot symbols, then it would be possible to identify whether the SINR experienced is the same on both, or whether for example, the first symbol has higher SINR than the second symbol. To provide added certainty, this approach (whether using pilot symbols or otherwise) could be measured multiple times before making a decision.

These approaches help to determine delay spread more accurately. In other words, they avoid other environmental effects that can influence the delay spread determination. In this context, the guard period is used mainly for cancelling the environmental effects other than delay spread, rather than for synchronization purposes.

In general terms, the step of configuring the transmission symbols may therefore comprise one or more of: setting a cyclic prefix associated with the transmission symbols on all or a subset of subcarriers, based on a pre-determined worst possible delay spread for the UE; inserting a guard period after the transmission symbols on all or a subset of subcarriers (for example, by muting at least part of a symbol subsequent to the transmission symbols); and muting some of the transmission symbols on all or a subset of subcarriers. Additionally or alternatively, the step of checking may comprise: for each of the transmission symbols, estimating a respective SINR. Then, the step of checking may further comprise: checking that the SNIR for the transmission symbol transmitted first in time is higher than the respective SNIR for each of a plurality of subsequent transmission symbols (in a specific sequence or message).

Determination of the delay spread is performed in measurement step 130 and can be performed in a number of ways. Two specific approaches will now be considered. As before, these will be discussed assuming that the pilot symbols are measured, but other symbols may additionally or alternatively be measured instead. In a first approach, the delay spread is estimated by comparing the signal level of pilot symbols across the channel for frequency domain coherence. The pilot symbols are scattered across the frequency domain. Then, the delay spread may be calculated using the following relationship:

$$\text{Delay spread} \approx 1/(\text{Coherence bandwidth}).$$

In other words, the delay spread (in seconds) is approximately the reciprocal of the coherence bandwidth (in Hz). Measuring the coherence bandwidth is possible if the measured symbols are spread across the channel bandwidth. In LTE for instance, the pilot symbols are spread over the frequency domain (one pilot in every 4 subcarriers), to make sure that all variations of the channel are captured. Therefore, pilot symbols are advantageously used. To measure the coherence bandwidth, the channel can be observed for each of these pilot symbols, check if it varies more than a predefined threshold. The threshold may be defined low enough to have an accurate estimation. For example, starting with pilot symbol 1 (lowest in RF frequency), the channel coefficient of this symbol is measured. Then, the channel coefficient for pilot symbol 2 (next lowest in frequency) is measured and if the channel coefficient between the two symbols changes less than a threshold, the next pilot is measured. This is continued with the same criteria until the channel coefficient for the measured symbol changes (from that of the first pilot symbol) more than the threshold. The coherence bandwidth will be considered equal to the difference in frequency between the two pilots having their channel coefficients different by more than the threshold.

Therefore, if pilot signals are located uniformly across the channel in various subcarriers and assuming all of the pilot symbols are sent with the same power level, the UE can determine the coherence bandwidth based on a defined level of tolerance given by the threshold.

In general terms, it may be considered that the determined information comprises whether a channel coefficient for each of the transmission symbols varies more than (or at least) a predefined threshold. Then, the step of establishing may comprise determining a coherence bandwidth based on the determined information and establishing the delay spread using the determined coherence bandwidth.

In another general aspect, there may be considered a method of establishing a delay spread from received transmission symbols using a transmission technology (Radio Access Technology or air interface) based on OFDM. The method comprises: determining a coherence bandwidth based on whether a channel coefficient for each of the transmission symbols varies more than a predefined threshold, the delay spread being established using the determined coherence bandwidth. In either aspect, the coherence bandwidth may be established by determining the frequency difference between two transmission symbols whose respective channel coefficients vary by more than (or at least) the predefined threshold. In any case, the delay spread is advantageously established based on the reciprocal of the coherence bandwidth.

Using the coherence bandwidth may allow determination of delay spread in an approximate sense. However, it may not allow the system to know exactly the relative level of different signal spikes for the delay spread. Therefore, another approach can be considered, which uses the relationship between CP and the received SINR for the base station transmission symbols. This may permit the relative level of different signal spikes to be determined.

In this approach, a large CP is initially selected for the symbols transmitted by the base station. Then, the SINR of the symbols (for instance, pilots) received at the UE. Then, the CP length is reduced step-by-step (incrementally) until a change in the received SINR is detected. In particular, the SINR may decrease if the CP is smaller than the delay spread, because interference coming from different paths of the channel is added. Then, the delay spread will be equal to the CP length of the previous step. The channel may be muted periodically to allow this method to be used.

In the general terms used herein, it may be understood that the determined information may comprise a relationship between a cyclic prefix associated with the transmission symbols and a SINR for the transmission symbols received at the UE. For example, such a relationship may indicate an absolute amount and/or a relative change in SINR as CP is changed. The delay spread may be established using the determined relationship.

In another generalised aspect, there may be considered a method of establishing a delay spread from received transmission symbols using OFDM. The method comprises: determining a relationship between a cyclic prefix associated with the transmission symbols and a SINR for the received transmission symbols, the delay spread being established using the determined relationship.

In either aspect, the relationship is beneficially determined by: measuring a SINR for a first subset of the transmission symbols, the first subset of the transmission symbols being transmitted with a first cyclic prefix; measuring a SINR for a $n^{th}$ subset of the transmission symbols, n being initially set as 2, the $n^{th}$ subset of the transmission symbols being transmitted with a $n^{th}$ cyclic prefix that is shorter than the first cyclic prefix; if the SINR for the $n^{th}$ subset of the transmission symbols is not less than the SINR for the first subset of the transmission symbols by at least a predetermined amount, repeating the step of measuring a SINR for a $n^{th}$ subset of the transmission symbols for n=n+1, the $(n+1)^{th}$ cyclic prefix being smaller than the $n^{th}$ cyclic prefix; and if the SINR for the $n^{th}$ subset of the transmission symbols is less than the SINR for the first subset of the transmission symbols by at least a predetermined amount, establishing the delay spread based on the $(n-1)^{th}$ cyclic prefix.

A dynamic CP flag is set in step 140 (to allow the base station to know that the CP is to be changed) and the delay spread or the information used to determine the delay spread is reported to the base station over the network in reporting step 150. The delay spread may be included in the channel state information (CSI) or signalled separately. Alternatively, the UE may even determine an appropriate CP based on the information, rather than communicating the delay spread directly. For instance, the UE could be provided a set of potential CPs associated with an index. Then, the UE could report the CP that seems to best fit with its current channel. This approach may save information bits. In general terms, the method may further comprise: communicating from the UE to the base station, an indication of one or more of: the determined information; the delay spread calculated from the determined information; and an indication of a cyclic prefix based on the determined information.

Then, the base station will determine (decide) the appropriate CP to use based on the information received from the UE. It will then communicate an instruction to the UE with the CP to use. This takes place in configuration step 160. Configuring the UE with the new CP may be achieved using signalling including an activation time (for instance, mapped to the downlink symbol or sub-frame timing previously identified via the sync channel). This would be followed by the device when receiving the channel. The same mechanism could also be used for the base station to request a change of CP from the device in the uplink direction. In general terms, the method may therefore further comprise transmitting and/or receiving an instruction from the base station to/at the UE to set or adjust the cyclic prefix for transmitting and/or receiving the transmissions at the UE. The process then completes with end step 170.

Figure 2:
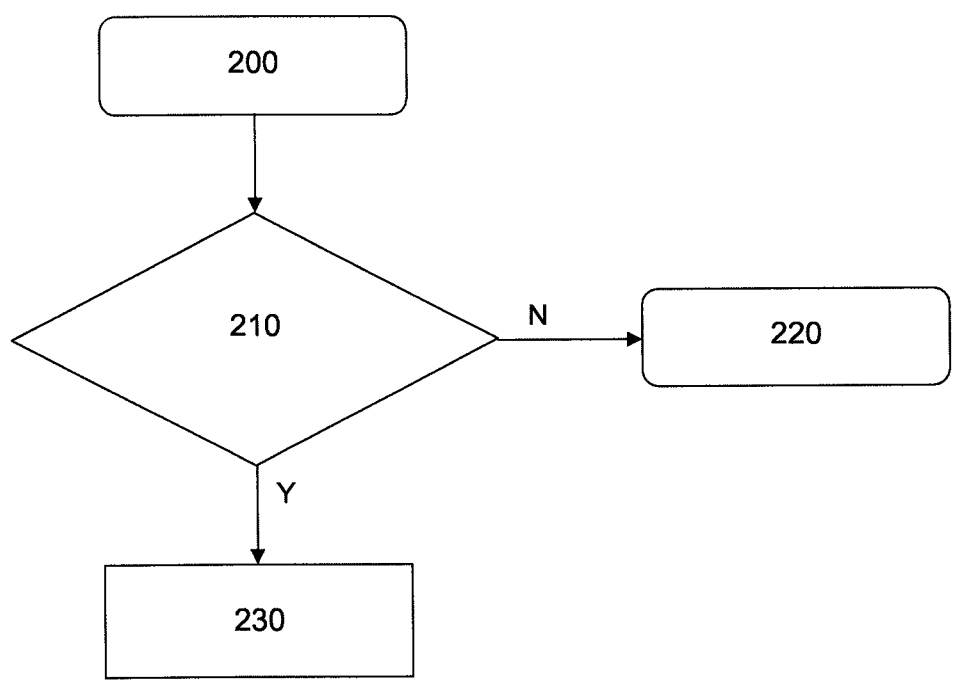
FIG. 2 shows a flow chart to indicate a second method of operation in accordance with the disclosure.

As noted above, accurate measurement of the delay spread may require muting of the channel, which will add overhead. In order to limit the overhead caused by muting the channel or any method to ensure zero or low ISI, the system could have some pre-process by which a potential issue could be detected. This may be based on device reporting or on some other event being detected at the base station. Low (for instance, lower than a threshold) inter-site co-channel interference will also be highly desirable here in this case. In other words, once a suitable CP length has been determined, it may not be necessary to calculate the delay spread frequently. Instead, a potential issue (such as a change in the channel coefficients) may be detected, without muting the channel. The potential issue may be identified by assessment of the measurements used to determine the delay spread, but without actual determination of the delay spread in that case. For instance, an estimate of SINR on a per symbol basis may be used and detecting that the first symbol transmitted for this UE has higher SINR than the subsequent symbols may indicate an issue. Referring now to FIG. 2, there is shown a flow chart to indicate a second method of operation in accordance with the disclosure. This begins with initialisation step 200.

Subsequently in checking step 210, the following could be performed. Firstly, the base station or UE can compare the current CP with the potentially needed CP. This may be based on some reporting from the device that allows the base station to become aware that a problem with CP is suspected. This could be reported via Layer 1, MAC layer, or RRC layer. The Base Station can then configure a longer CP to check if there is really an ISI problem. If no problem is identified, the process stops and end step 220. Otherwise, the renegotiation process of FIG. 1 is resumed in step 230.

In general terms, the method may further comprise identifying a change in the delay spread based on the determined information. Then, the method may further comprise communicating from the UE to the base station an indication that an adjustment to the cyclic prefix for the transmissions should be made. The method may then comprise communicating (transmitting and/or receiving) an instruction from the base station at the UE to adjust the cyclic prefix for transmitting and/or receiving the transmissions at the UE.

The UE may simultaneously communicate with multiple base stations, for example in Cooperative Multi-Point (CoMP) systems. Then, a decision can be about the CP by looking at the longest measured delay spread of the combined signals from both base stations. A variation of delay spread of the channel may be known. For example, when operating in a specific band, a delay spread in a known range may be expected and therefore a CP corresponding with the highest delay spread may initially be selected for CoMP operation.

In general terms, the base station can be considered a first base station and the determined information considered first information. The UE is then advantageously configured to communicate with the first base station and with a second base station of the cellular network at the same time. Here, the method may further comprise: determining, at the UE, second information for calculating a delay spread for transmission symbols from the second base station to the UE. The step of identifying a cyclic prefix for the transmissions is then beneficially based on the first information and the second information. Preferably, the step of identifying a cyclic prefix for the transmissions is based on: the first information, if a delay spread calculated from the first information is longer than a delay spread calculated from the second information; and the second information, if a delay spread calculated from the second information is longer than a delay spread calculated from the first information.

Although specific embodiments have now been described, the skilled person will understand that various modifications and variations are possible. For example, reporting to the base station may be alternatively be replaced by reporting to the network in some other way. Although the approach described herein is implemented by the UE determining the delay spread (or information used to calculate it), it will be recognised that the base station may also determine the delay spread (or information used to calculate it) in some embodiments. The approach described herein is applicable to any OFDM RAT or air interface using a cyclic prefix, such as filtered OFDM (F-OFDM) or windowed OFDM (W-OFDM).

Combinations of any aspects, specific features shown with reference to one embodiment (or general disclosure) or with reference to multiple embodiments (general disclosures) are also provided, even if that combination has not been explicitly detailed herein. Any of the methods disclosed herein may be provided in the form of a computer program configured to perform the respective method when operated by a processor. A computer readable medium storing such a computer program may further be provided. In addition, an entity for operation in a cellular network (a cellular network device), configured to perform any of the methods disclosed herein may be considered. Such an entity may be a cellular device (terminal or UE) or a base station (or cell) controller. A base station or cell comprising such a controller may further be considered. The entity may have structural features such as a transmitter, receiver and/or processor, configured to perform individual method steps discussed herein.

The invention claimed is:

1. A method for configuring a cyclic prefix for transmissions on a cellular network using a Radio Access Technology based on Orthogonal Frequency Division Multiplexing, OFDM, the method comprising:
    determining, at a User Equipment, UE, of the cellular network, information for calculating a delay spread for transmission symbols from a base station of the cellular network to the UE;
    identifying a cyclic prefix for the transmissions based on the determined information;
    checking that intra-carrier inter-symbol interference is the dominant source of interference to the transmission symbols from the base station to the UE; and/or
    configuring the transmission symbols from the base station to the UE such that intra-carrier inter-symbol interference is the dominant source of interference to the transmission symbols from the base station to the UE,
    wherein the step of checking comprises:
    for each of the transmission symbols, estimating a respective signal-to-interference-plus-noise ratio, SINR; and
    checking that the SNIR for the transmission symbol transmitted first in time is higher than the respective SNIR for each of a plurality of subsequent transmission symbols.

2. The method of claim 1, further comprising:
    communicating from the UE to the base station, an indication of one or more of: the determined information; the delay spread calculated from the determined information; and an indication of a cyclic prefix based on the determined information; and
    receiving an instruction from the base station at the UE to set or adjust the cyclic prefix for transmitting and/or receiving the transmissions at the UE.

3. The method of claim 1, wherein the step of configuring the transmission symbols comprises one or more of:
    setting a cyclic prefix associated with the transmission symbols on all or a subset of subcarriers, based on a pre-determined worst possible delay spread for the UE;
    inserting a guard period after the transmission symbols on all or a subset of subcarriers; and
    muting some of the transmission symbols on all or a subset of subcarriers.

4. The method of claim 1, further comprising:

identifying a change in the delay spread based on the determined information; and communicating from the UE to the base station an indication that an adjustment to the cyclic prefix for the transmissions should be made; and receiving an instruction from the base station at the UE to adjust the cyclic prefix for transmitting and/or receiving the transmissions at the UE.

5. The method of claim 1, wherein the transmission symbols from a base station of the cellular network to the UE comprise pilot symbols.

6. A cellular network device configured to operate in accordance with the method of claim 1.

7. A method for configuring a cyclic prefix for transmissions on a cellular network using a Radio Access Technology based on Orthogonal Frequency Division Multiplexing, OFDM, the method comprising:

determining, at a User Equipment, UE, of the cellular network, information for calculating a delay spread for transmission symbols from a base station of the cellular network to the UE;

identifying a cyclic prefix for the transmissions based on the determined information; and establishing the delay spread based on the determined information, wherein the determined information comprises whether a channel coefficient for each of the transmission symbols varies more than a predefined threshold; and wherein the step of establishing comprises determining a coherence bandwidth based on the determined information and establishing the delay spread using the determined coherence bandwidth.

8. The method of claim 7, wherein the determined information comprises a relationship between a cyclic prefix associated with the transmission symbols and a signal-to-interference-plus-noise ratio, SINR, for the transmission symbols received at the UE; and wherein the step of establishing comprises establishing the delay spread using the determined relationship.

9. A method for configuring a cyclic prefix for transmissions on a cellular network using a Radio Access Technology based on Orthogonal Frequency Division Multiplexing, OFDM, the method comprising:

determining, at a User Equipment, UE, of the cellular network, information for calculating a delay spread for transmission symbols from a base station of the cellular network to the UE; and identifying a cyclic prefix for the transmissions based on the determined information, wherein the base station is a first base station and the determined information is first information, the UE being configured to communicate with the first base station and with a second base station of the cellular network at the same time and the method further comprising:

determining, at the UE, second information for calculating a delay spread for transmission symbols from the second base station to the UE; and wherein the step of identifying a cyclic prefix for the transmissions is based on the first information and the second information.

10. The method of claim 9, wherein the step of identifying a cyclic prefix for the transmissions is based on: the first information, if a delay spread calculated from the first information is longer than a delay spread calculated from the second information; and the second information, if a delay spread calculated from the second information is longer than a delay spread calculated from the first information.

11. A method of establishing a delay spread from received transmission symbols using a transmission technology based on Orthogonal Frequency Division Multiplexing, OFDM, the method comprising:

determining a coherence bandwidth based on whether a channel coefficient for each of the transmission symbols varies more than a predefined threshold, the delay spread being established using the determined coherence bandwidth; and/or determining a relationship between a cyclic prefix associated with the transmission symbols and a signal-to-interference-plus-noise ratio, SINR, for the received transmission symbols, the delay spread being established using the determined relationship, wherein the delay spread is established based on the reciprocal of the coherence bandwidth, and wherein the relationship is determined by:

measuring a SINR for a first subset of the transmission symbols, the first subset of the transmission symbols being transmitted with a first cyclic prefix;

measuring a SINR for a $n^{th}$ subset of the transmission symbols, n being initially set as 2, the $n^{th}$ subset of the transmission symbols being transmitted with a $n^{th}$ cyclic prefix that is shorter than the first cyclic prefix;

if the SINR for the $n^{th}$ subset of the transmission symbols is not less than the SINR for the first subset of the transmission symbols by at least a predetermined amount, repeating the step of measuring a SINR for a $n^{th}$ subset of the transmission symbols for n=n+1, the $(n+1)^{th}$ cyclic prefix being smaller than the $n^{th}$ cyclic prefix; and if the SINR for the n subset of the transmission symbols is less than the SINR for the first subset of the transmission symbols by at least a predetermined amount, establishing the delay spread based on the $(n-1)^{th}$ cyclic prefix.

* * * * *